Jan. 28, 1969   N. H. COOK ET AL   3,424,054
METHOD OF MACHINING METALS AND APPARATUS THEREFOR
Filed June 14, 1965
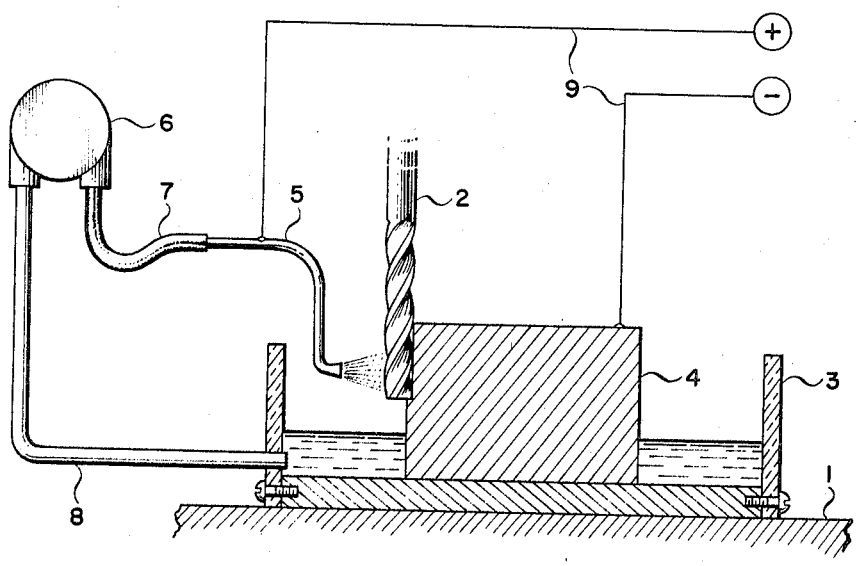
INVENTORS.
NATHAN H. COOK
ROBERT L. VAUGHN
BY
Agent 3,424,054
METHOD OF MACHINING METALS AND APPARATUS THEREFOR
Nathan H. Cook, Concord, Mass., and Robert L. Vaughn, Granada Hills, Calif., assignors to Lockheed Aircraft Corporation, Los Angeles, Calif., a corporation of California
Filed June 14, 1965, Ser. No. 463,689
U.S. Cl. 90—11     2 Claims
Int. Cl. B23c 7/00; C23b 5/00, 9/00

ABSTRACT OF THE DISCLOSURE

A method and apparatus for machining metal bodies such as titanium. During machining an electrolyte containing a dissolved salt of a soft metal is sprayed against a cutting tool and the metal body being machined. Electrical connections are made such that the spray flows from an anode to the metal body connected as cathode. The soft metal electrodeposits upon the tool and metal body thus acting as a lubricant.

---

This invention relates to an apparatus and method for increasing the productivity of machining operations.

The machining of certain metals is known to be a difficult process due to the hardness of the metals, the unusual tendency to adhere, and the consequent rapid deterioration of the cutting edges of cutting tools employed. Titanium is typical of the known difficult-to-machine materials and while not limited thereto, the present invention will be described as specifically applied to the machining of titanium.

A primary object of the invention is to provide an improved method for machining titanium and other hard-to-machine materials.

Another object of the invention is to provide a method and apparatus for continuously applying an effective lubricant to the sliding surfaces during machining.

A further object of the invention is to provide a novel process for electrolytically depositing a thin layer of a soft metal as a lubricant.

These and other objects will become apparent from the following description when taken with the single figure of the drawing which shows a typical set-up of apparatus embodying the invention.

The process of forming the lubricant coating upon the cutting surface of the machining tool comprises the steps of continuously spraying an electrolyte containing a dissolved soft metal against the tool, and applying an electric current through the electrolyte and tool to continuously electroplate the soft metal on the tool.

The use of lubricants in machining operations to reduce tool wear and increase the efficiency of machining is well-known. The use of soft metal as a coating on the material to be machined is also well-known. However, the continuous application of a soft metal to the cutting tool to increase the efficiency of the machining operation is heretofore unknown.

With reference to the drawing, the invention is illustrated as applied to an end milling machine 1 having a cutter 2. A tank preferably having side walls 3 of plexiglass or other transparent material surrounds the workpiece 4. A metal tube 5 is positioned adjacent the cutter and is attached to a pump 6 through a rubber hose 7. A return line 8 is attached between the bottom of the tank and the inlet to the pump. A source of D.C. voltage 9 is connected between the metal tube 5 and the workpiece 4 or tool 2.

It is of course understood that since the tube 5 is anodic, dissolution of the tube will normally occur. Accordingly, it is preferable to use an inert tube (such as a platinum coating) or that the tube be of the same metal as that being plated. Otherwise, dissolution of the tube causes contamination of the plating solution, necessitating replacement of the solution. Alternatively, a non-conducting tube may be used having an electrode (anode) within the electrolyte stream.

An electrolytic solution of a soft metal, such as lead, tin, cadmium, copper, zinc or the like, is continuously sprayed from the lower end of the tube 5 onto the cutter and workpiece. With the circuit closed through the power supply the soft metal is electroplated on the cutting tool. The usual limitation of a soft metal as a lubricant, viz., that it is rapidly worn off the sliding surface, does not apply in this case as the metal is continually re-applied by electrolysis.

It will be noted that the sliding surface acts as the cathode for the electrolysis. The cutting tool makes good electric contact with the workpiece and receives most of the soft metal electroplate. For best results a potential difference of 75 volts has been used although a 20 volt difference produces the desired effect.

While the present invention is not restricted to the use of any particular electrolyte, strong (nearly saturated) water solutions of soluble salts of the following metals have been used with very good results:

Lead nitrate
Stannous sulfate
Cadmium sulfate
Zinc sulfate and zinc chloride
Ferrous sulfate
Copper sulfate
Copper nitrate and lead nitrate
Stannous sulfate, zinc chloride and zinc sulfate During machining operations it has been found that metal chips are sometimes caught between the metal tube to which the positive voltage is applied and the tool which carries the negative voltage. To avoid sparking and overload conditions, it is preferable and desirable to insert a series low-resistance high-wattage resistor at the output of the power source.

A series of tests have been made to demonstrate the superiority of the present invention over commercial cutting fluids for two alloys of titanium, namely, titanium alloy A–110 and alloy B–120. Use of the present invention extended tool life as much as four to five times that provided by commercial fluids, and particularly at the higher cutting speeds. It is also of interest to note that at the lowest speeds the lead (the softest material) was lubricant; at intermediate speeds the tin (with intermediate hardness the best) performed best; and at the top speeds the zinc (harder still) was the best lubricant.

While a specific embodiment of the invention has been shown and described, it should be understood that certain alterations, modifications and substitutions may be made to the instant disclosure without departing from the spirit and scope of the invention as defined by the appended claims.

What is claimed is:

1. The method of machining titanium and other hard to machine metals comprising the steps of contacting a metal workpiece with a machining tool, moving the tool relative to the workpiece, continuously spraying the tool and workpiece with an electrolyte containing a dissolved salt of a soft metal and applying an electric current through the electrolyte and tool-workpiece to continuously electroplate the soft metal on the tool-workpiece.

2. In a machining apparatus comprising a cutting tool for machining a workpiece, the improvement in said apparatus comprising a metal tube for spraying an electrolyte containing a dissolved salt of a soft metal onto the tool and workpiece, electrical means connected to said tube and adapted to be connected to said workpiece, said tube being connected as anode and said workpiece as cathode, and means for flowing said electrolyte through said tube, whereby said electrolyte sprays against said tool and workpiece and soft metal is electroplated onto said tool and workpiece.

References Cited

UNITED STATES PATENTS

| 2,854,387 | 9/1958 | Zimmerman | 204—45 XR |
| 2,873,232 | 2/1959 | Zimmerman | 204—45 XR |

ROBERT K. MIHALEK, *Primary Examiner.*

G. KAPLAN, *Assistant Examiner.*

U.S. Cl. X.R.

29—106; 204—23, 224; 219—68